(12) United States Patent
Kim et al.

(10) Patent No.: US 11,129,173 B2
(45) Date of Patent: Sep. 21, 2021

(54) METHOD AND APPARATUS FOR TRANSMITTING SIDELINK FEEDBACK INFORMATION

(71) Applicant: Electronics and Telecommunications Research Institute, Daejeon (KR)

(72) Inventors: Yun Joo Kim, Seongnam-si (KR); Yu Ro Lee, Daejeon (KR); EunKyung Kim, Daejeon (KR); Tae Joong Kim, Daejeon (KR); Hyun Seo Park, Daejeon (KR); An Seok Lee, Daejeon (KR); Sung Cheol Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/557,164

(22) Filed: Aug. 30, 2019

(65) Prior Publication Data

US 2020/0170023 A1 May 28, 2020

(30) Foreign Application Priority Data

Nov. 23, 2018 (KR) ......................... 10-2018-0146573
Jul. 23, 2019 (KR) ......................... 10-2019-0088919

(51) Int. Cl.
*H04W 72/12* (2009.01)
*H04W 92/18* (2009.01)

(52) U.S. Cl.
CPC ..... *H04W 72/121* (2013.01); *H04W 72/1268* (2013.01); *H04W 72/1273* (2013.01); *H04W 72/1284* (2013.01); *H04W 72/1289* (2013.01); *H04W 92/18* (2013.01)

(58) Field of Classification Search
None
See application file for complete search history.

(56) References Cited

U.S. PATENT DOCUMENTS

| | | |
|---|---|---|
| 9,515,800 B2 | 12/2016 | Lim et al. |
| 9,635,684 B2 | 4/2017 | Ko et al. |
| 9,768,933 B2 | 9/2017 | Hwang |

(Continued)

FOREIGN PATENT DOCUMENTS

KR    1020160135735 A    11/2016

OTHER PUBLICATIONS

3GPP TSG RAN WG1 #95 (Nov. 3, 2018), ZTE et al., R1-1812730, "Support of unicast, groupcast and broadcast in NR V2X", ZTE, Sanechips.

(Continued)

*Primary Examiner* — Jamaal Henson
(74) *Attorney, Agent, or Firm* — Rabin & Berdo, P.C.

(57) ABSTRACT

A device-to-device (D2D) communication method, performed by a receiving D2D terminal, may comprise receiving D2D data from a transmitting D2D terminal; generating feedback information for the D2D data; and receiving information on a first resource for transmission of the feedback information from a base station, and transmitting the feedback information to the transmitting D2D terminal through the first resource, wherein the information on the first resource is received without an explicit scheduling request (SR) to the base station.

17 Claims, 7 Drawing Sheets

(56) References Cited

U.S. PATENT DOCUMENTS

| | | | |
|---|---|---|---|
| 9,844,029 B2* | 12/2017 | Suzuki | H04L 5/001 |
| 9,986,485 B2 | 5/2018 | Gulati et al. | |
| 10,064,229 B2 | 8/2018 | Yang et al. | |
| 2013/0223356 A1* | 8/2013 | Khoshnevis | H04W 72/042 370/329 |
| 2013/0322413 A1* | 12/2013 | Pelletier | H04L 5/0091 370/336 |
| 2014/0177540 A1* | 6/2014 | Novak | H04W 72/0406 370/329 |
| 2015/0011230 A1* | 1/2015 | Noh | H04W 72/12 455/450 |
| 2015/0023267 A1* | 1/2015 | Lim | H04W 72/0406 370/329 |
| 2015/0078270 A1* | 3/2015 | Seo | H04W 52/248 370/329 |
| 2017/0280469 A1 | 9/2017 | Park et al. | |
| 2018/0234210 A1 | 8/2018 | Maaref et al. | |
| 2020/0221520 A1* | 7/2020 | Wakabayashi | H04W 76/11 |
| 2020/0267702 A1 | 8/2020 | Kim et al. | |

OTHER PUBLICATIONS

3GPP TSG RAN WG1 Meeting #95 (Nov. 3, 2018), R1-1812879, "Discussion on HARQ feedback and CSI acquisition for sidelink", CMCC.

3GPP TSG RAN WG1 Meeting #95 (Nov. 3, 2018), R1-1813554, "Design and contents of PSCCH and PSFCH", Huawei, HiSilicon.

* cited by examiner

METHOD AND APPARATUS FOR TRANSMITTING SIDELINK FEEDBACK INFORMATION

CROSS-REFERENCE TO RELATED APPLICATIONS

This application claims priority to Korean Patent Applications No. 10-2018-0146573 filed on Nov. 23, 2018 and No. 10-2019-0088919 filed on Jul. 23, 2019 in the Korean Intellectual Property Office (KIPO), the entire contents of which are hereby incorporated by reference.

BACKGROUND

1. Technical Field

The present disclosure relates to device-to-device (D2D) communication or sidelink communication, and more particularly, to a method and an apparatus for performing feedback on a D2D transmission or a sidelink transmission for transmission of data having a high reliability requirement in applications such as enhanced vehicle-to-everything (eV2X) communication and smart factory.

2. Related Art

Future mobile communications systems, including 'beyond 5G (B5G)', provide a more advanced environment in terms of transmission speed, latency, number of connectable devices, power efficiency, and frequency bands. In particular, ultra-low latency is required beyond 5G service requirements proposed by International Telecommunication Union-Radiocommunication sector (ITU-R) and low-latency performance targets for 5G services proposed by 5G communication being standardized in $3^{rd}$ generation partnership project (3GPP) for communication services between objects through real-time interaction.

The device-to-device (D2D) communication or sidelink communication refers to a technology that can directly transmit and receive data between terminals located at a physically close distance without going through a network such as a base station. In addition, the D2D communication may include not only communication between simple terminals having a communication function, but also communication between various types of terminals having a communication function such as a smartphone or a personal computer. In a cellular network, all data is transmitted to each user through a base station. On the other hand, D2D communication can reduce such the two-stage transmission through the base station to one-stage transmission. Also, when a distance between the terminals is shorter than a distance to the base station, a transmission distance is shortened and an interference range is also reduced, so that latency can be reduced and power can be more efficiently used. The D2D communication can be used both in cellular networks that require infrastructure such as base stations, as well as in ad-hoc networks that do not require infrastructure. In particular, D2D technology, which is integrated with 5G technology such as enhanced vehicle-to-everything (eV2X), can respond sensitively to mobility and topology change of a terminal, which is advantageous for providing ultra-low latency communication that enables real-time response.

In an LTE-based cellular network, a hybrid automatic repeat and request (HARQ) operation is used as a control scheme for data reception failure in communication between a base station and a terminal. Even in D2D technology, which has evolved from broadcast transmission, a D2D terminal receiving data through D2D communication may perform HARQ combining. However, HARQ feedback is not transmitted. In other words, since the D2D terminal is limited in supporting a function of operating based on the feedback, reliability of the data cannot be guaranteed and latency experienced by the data in a radio link may be increased. In addition, the current D2D communication has a limitation in adapting to a fast link change because there is no feedback on channel state information.

SUMMARY

Accordingly, exemplary embodiments of the present disclosure provide a method of transmitting feedback information in sidelink communication.

Accordingly, exemplary embodiments of the present disclosure also provide an apparatus for transmitting feedback information in sidelink communication.

According to exemplary embodiments of the present disclosure, a device-to-device (D2D) communication method performed by a receiving D2D terminal may comprise receiving D2D data from a transmitting D2D terminal; generating feedback information for the D2D data; and receiving information on a first resource for transmission of the feedback information from a base station, and transmitting the feedback information to the transmitting D2D terminal through the first resource, wherein the information on the first resource is received without an explicit scheduling request (SR) to the base station.

The D2D data may be received from the transmitting D2D terminal through an uplink resource for the base station, and the feedback information may be transmitted to the transmitting D2D terminal through the first resource which is a downlink resource for the base station.

The transmission of the feedback information through the first resource may be performed together with an uplink transmission to the base station or another D2D link transmission or reception operation of the receiving D2D terminal.

The information on the first resource may be received from the base station through a physical downlink control channel (PDCCH).

The feedback information may be transmitted to the transmitting D2D terminal through a physical downlink control channel (PDCCH) or a dedicated physical downlink channel for sidelink feedback information.

The information on the first resource may be received at a time point identical to a first time point when a grant for a scheduling request (SR) of the transmitting D2D terminal is transmitted from the base station or a time point after a lapse of a predefined or preconfigured time from the first time point.

When the transmitting D2D terminal performs an SR to the base station, information indicating whether the receiving D2D terminal performs feedback on the D2D data may be transmitted to the base station, and the information on the first resource may be received when the receiving D2D terminal is indicated to perform the feedback on the D2D data.

Further, according to exemplary embodiments of the present disclosure, a device-to-device (D2D) communication method performed by a receiving D2D terminal may comprise receiving, from a base station, information on a first resource for reception of D2D data and information on a second resource for transmission of feedback information for the D2D data; receiving the D2D data from a transmitting D2D terminal through the first resource; generating the feedback information for the D2D data; and transmitting the feedback information to the transmitting D2D terminal through the second resource.

The D2D data may be received from the transmitting D2D terminal through the first resource which is an uplink resource for the base station, and the feedback information may be transmitted to the transmitting D2D terminal through the second resource which is a downlink resource for the base station.

The information on the second resource may be received from the base station through a physical downlink control channel (PDCCH).

When the D2D data is unicast data, the second resource may be a resource allocated exclusively to the receiving D2D terminal.

When the D2D data is groupcast data, the second resource may be a resource pool allocated to a plurality of receiving D2D terminals including the receiving D2D terminal.

The feedback information may be transmitted to the transmitting D2D terminal through a physical downlink control channel (PDCCH) or a dedicated physical downlink channel for sidelink feedback information.

Furthermore, according to exemplary embodiments of the present disclosure, a device-to-device (D2D) communication method performed by a transmitting D2D terminal may comprise requesting a base station for a first resource for transmission of D2D data for at least one receiving D2D terminal; receiving, from the base station, information on the first resource and information on a second resource for reception of feedback information for the D2D data from the at least one receiving D2D terminal; transmitting the D2D data to the at least one receiving D2D terminal through the first resource; and receiving the feedback information for the D2D data from the at least one receiving D2D terminal through the second resource.

The D2D data may be transmitted by the transmitting D2D terminal through the first resource which is an uplink resource for the base station, and the feedback information may be received from the at least one receiving D2D terminal through the second resource which is a downlink resource for the base station.

The information on the second resource may be received from the base station through a physical downlink control channel (PDCCH).

In the requesting of the first resource, the transmitting D2D terminal may transmit to the base station at least one of information on the D2D data, whether or not to receive the feedback information for the D2D data, and a type of the feedback information.

When the D2D data is unicast data, the at least one receiving D2D terminal may be one receiving D2D terminal, and in the requesting of the first resource, the transmitting D2D terminal may transmit to the base station an identifier of the one receiving D2D terminal or an identifier of a D2D link between the one receiving D2D terminal and the transmitting D2D terminal.

When the D2D data is groupcast data, the at least one receiving D2D terminal may be a plurality of receiving D2D terminals, and in the requesting of the first resource, the transmitting D2D terminal may transmit to the base station a group identifier indicating the plurality of receiving D2D terminals.

The second resource may be a resource pool from which the at least one receiving D2D terminal selects a resource for transmitting the feedback information for the D2D data.

Using the exemplary embodiments according to the present disclosure, based on feedback transmission assistance information provided from a base station, a receiving D2D terminal can transmit feedback information for data received from a transmitting D2D terminal to the transmitting D2D terminal through a D2D link allocated as a downlink resource.

Through this, the receiving D2D terminal may inform the transmitting D2D terminal that the data transmitted by the transmitting D2D terminal is normally received without an error and may request transmission of new data to the transmitting D2D terminal. On the other hand, when the data transmitted by the transmitting D2D terminal is not normally received, the receiving D2D terminal may inform the transmitting D2D terminal that the data reception was not normally performed and may request retransmission. Accordingly, it is made possible to reduce the latency caused by unnecessary retransmission in D2D communication and to have high reliability communication coping with a fast channel change.

Further, in comparison with the conventional D2D communication in which a separate D2D link configuration consisting of uplink resources is required for transmission of the feedback information, exemplary embodiments according to the present disclosure can utilize a downlink resource already configured with the base station for transmission of the feedback information. Accordingly, an additional latency of link establishment for transmitting the feedback information can be reduced. Also, since uplink data transmission of the terminal can be performed simultaneously with the transmission of the feedback information, the uplink transmission or another D2D link transmission of the terminal can be performed more flexibly with the transmission of the D2D feedback information.

Therefore, exemplary embodiments according to the present disclosure are suitable for applications requiring real time interaction with high reliability and high level of ultra-low latency control requirements such as the smart factory or the eV2X.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
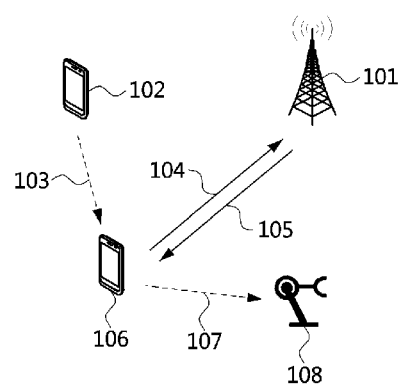
FIG. 1 is a diagram for conceptually describing D2D communication in a mobile communication system to which exemplary embodiments of the present disclosure are be applied.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Throughout the specification, a terminal may be a mobile terminal (MT), a mobile station (MS), an advanced mobile station (AMS), a high reliability mobile station (HR-MS), a subscriber station (SS), a portable subscriber station (PSS), an access terminal (AT), an user equipment (UE), or the like. Also, the terminal may include all or a part of functions of MT, MS, AMS, HR-MS, SS, PSS, AT, UE, or the like. Various exemplary embodiments of the terminal may include a cellular telephone, a smart phone having a wireless communication function, a personal digital assistant (PDA) having a wireless communication function, a wireless modem, a portable computer having a wireless communication function, a digital camera having a wireless communication function, a gaming device having wireless communication capability, music storage and playback appliances with wireless communication capability, and internet appliances with wireless Internet access and browsing, as well as portable units or terminals incorporating combinations of such functions. However, the present disclosure is not limited thereto.

Also, a base station may be an advanced base station (ABS), a high reliability base station (HR-BS), a node B, an evolved node B (eNB), an access point (AP), a radio access station (RAS), a base transceiver station (BTS), a mobile multi-hop relay (MMR)-BS, a relay station (RS) performing a role of the base station, a high reliability relay station (HR-RS) performing a role of the base station, a small cell base station, or the like.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a diagram for conceptually describing D2D communication in a mobile communication system to which exemplary embodiments of the present disclosure are be applied.

Referring to FIG. 1, terminals 102, 106, and 108 participating in the D2D communication may communicate with a base station 101 by using downlink 105 and uplink 104, and may use D2D links 103 and 107 to communicate directly with the adjacent terminals. In this case, the terminals 102 and 106 may be user equipment (UE) mounted on vehicles or terminals that are carried by users. Meanwhile, the terminal 108 may be a roadside unit (RSU) installed on a road. However, the terminal 108 may also be a terminal mounted in a vehicle or a terminal carried by a user.

Hereinafter, terminals performing D2D communication through a D2D link are defined as 'D2D terminals', a D2D terminal transmitting data to other D2D terminal(s) among the D2D terminals is defined as a 'transmitting D2D terminal', and a D2D terminal receiving data from another D2D terminal is defined as a 'receiving D2D terminal'. The transmitting D2D terminal and the receiving D2D terminal performing D2D communication may access the base station and receive information on a cellular network and information for D2D operation (i.e., D2D configuration information or sidelink configuration information to be described later) from the base station. In this case, the information on the cellular network and the information for the D2D operation may be received through a downlink control channel (e.g., physical downlink control channel (PDCCH)), a higher layer signaling (e.g., radio resource control (RRC) signaling), or a combination of the PDCCH and the higher layer signaling.

Meanwhile, the transmitting and receiving D2D terminals performing the D2D communication in the cellular network may transmit and receive data through a resource indicated by resource allocation information obtained through a downlink control channel transmitted from the base station. Here, the resource allocated by the base station to directly transmit and receive the data between the D2D terminals may be an uplink resource.

The 3GPP long term evolution (LTE) or new radio (NR) based D2D communication supports sidelink, which is a channel structure defined for directly exchanging control information and data between terminals. The sidelink is an air interface structure composed of a logical channel, a transport channel, and a physical channel, conceptually contrasted with the downlink and the uplink used for signal and data communication between the base station and the user terminal. Therefore, in the following description, 'sidelink communication' may be used as the same meaning as the above-described 'D2D communication', and 'sidelink' may be used as the same meaning as the 'D2D link'.

Compared to downlink communication, which means communication from a base station to a terminal, and uplink communication, which means communication from a terminal to a base station, sidelink communication may mean communication between terminals. That is, the sidelink communication may refer to a communication scheme in which terminals located in a physically close distance can directly transmit and receive data without passing through a base station.

In addition, since the sidelink uses a resource allocated among uplink resources, it may operate in an uplink band in case of frequency division duplexing (FDD) and in subframes (or, slots or symbols) allocated as uplink subframes (or, slots or symbols) in case of time division duplexing (TDD). This is because, in the case of TDD, fewer uplink subframes are used compared to downlink subframes, and most of the downlink subframes are rarely empty. Due to this characteristic, a physical resource structure used for the sidelink may be configured in the same way as a physical resource structure used for the uplink. Also, a single carrier-frequency division multiple access (SC-FDMA) access scheme or an orthogonal frequency division multiple access (OFDMA) access scheme used in the uplink may be used for the sidelink.

In the LTE/NR-based cellular network, a hybrid automatic repeat and request (HARQ) scheme is used as a control scheme for a data reception failure in the communication between a base station and a terminal. In the D2D technology, which has evolved from broadcast transmission, a D2D terminal receiving data through D2D communication may perform HARQ combining. However, HARQ feedback is not transmitted. In other words, since the D2D terminal is limited in supporting a function of operating based on the feedback, reliability of the data cannot be guaranteed and latency experienced by the data in a radio link may be increased. In addition, there is a limitation in adapting to a fast link change because there is no feedback on channel state information.

Exemplary embodiments according to the present disclosure, which will be described below, provide a method of transmitting feedback information using downlink resources in D2D communication. For example, referring to FIG. 1, the terminals 102, 106, and 108 participating in the D2D communication may communicate with the base station 101 by using the downlink 105 and the uplink 104, and the D2D links 103 and 107 may be used to communicate directly with the adjacent terminals. In this case, in order to transmit feedback information for data received through the D2D link 107 from a transmitting terminal (e.g., 106), a receiving D2D terminal (e.g., 108) may use downlink resources allocated from the base station 101 to transmit the feedback information to the transmitting D2D terminal (e.g., 106).

As described above, the D2D terminal defined in the LTE/NR cannot perform transmission for another sidelink or uplink transmission to the base station when performing a sidelink reception operation using an uplink resource. However, in the exemplary embodiments according to the present disclosure, the D2D terminal may transmit sidelink feedback information by using downlink resources not used by the base station.

Table 1 below summarizes transmissions and receptions that the terminal 106 can perform simultaneously in the environment in which the uplink, the downlink, and the sidelink exist as illustrated in FIG. 1.

TABLE 1

| D2D RX | D2D TX | Terminal | DL TX | DL RX | UL TX |
|---|---|---|---|---|---|
| X | — | D2D TX | ○ | ○ | X |
| ○ | X | D2D RX | ○ | ○ | ○ |

According to Table 1, while transmitting data using the sidelink 107 from the D2D terminal 106 to the D2D terminal 108, reception and transmission with the D2D terminal 102 through the sidelink 103 are not supported. Downlink transmission and reception are possible, but uplink transmission cannot be supported.

On the other hand, while the D2D terminal 106 can receive data through the sidelink 103 from the D2D terminal 102 while receiving data using the sidelink 107 from the D2D terminal 108, transmission through the sidelink 103 is not supported. Both downlink transmission and reception are possible, and uplink transmission is also possible.

That is, the D2D terminal 106 should select one of the sidelink transmission or the uplink transmission for the transmission operation, and the transmission using the uplink may take precedence over the sidelink. Therefore, in the exemplary embodiments according to the present disclosure, the D2D terminal 106 may utilize downlink resources for transmission of sidelink feedback information. As shown in Table 1, downlink transmission may be performed together with uplink transmission or sidelink transmission and reception operations.

The exemplary embodiments according to the present disclosure to be described below provide a method for transmitting feedback information in D2D communication. Hereinafter, exemplary embodiments classified according to a scheme for a receiving D2D terminal to be allocated a resource for transmitting feedback information from a base station will be described.

Figure 2:
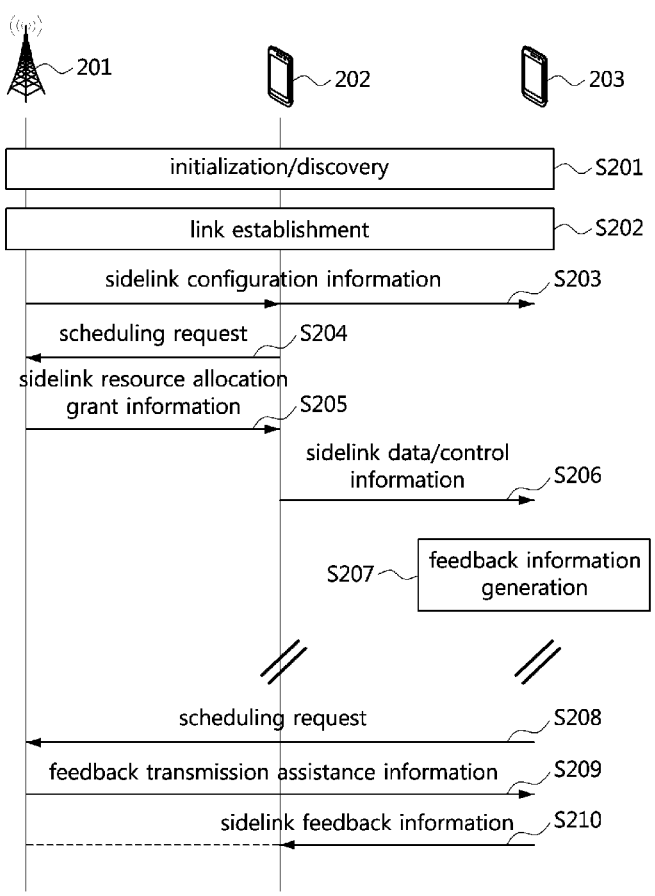
FIG. 2 is a sequence chart for explaining a method of transmitting feedback information for D2D data according to a first exemplary embodiment of the present disclosure.

FIG. 2 is a sequence chart for explaining a method of transmitting feedback information for D2D data according to a first exemplary embodiment of the present disclosure.

The exemplary embodiment illustrated in FIG. 2 corresponds to a case where a receiving D2D terminal requests a resource for transmitting feedback information to a base station in order to transmit the feedback information and transmits the feedback information through a resource allocated by the base station.

Referring to FIG. 2, each of D2D terminals 202 and 203 supporting D2D communication may be located within coverage of a base station 201 and may discover each counterpart terminal (S201). In this case, search for the counterpart terminal may be performed through the base station 201, or may be performed only by signaling between the D2D terminals 202 and 203. Then, the D2D terminals 202 and 203 discovered by each other may establish a D2D link (i.e., sidelink) (S202).

Then, the D2D terminals 202 and 203 may receive D2D configuration information (e.g., sidelink configuration information) from the base station 201 (S203). Here, the D2D configuration information (e.g., sidelink configuration information) is information that is configured in advance with respect to D2D communication required according to a service such as frequency and bandwidth, and is, for example, received as included in a system information block (SIB). However, the D2D configuration information may be received in a cell-specific RRC message or UE-specific RRC message, not necessarily SIB. In addition, a part of the D2D configuration information may be received through SIB and the other part may be received through an RRC message.

Then, the transmitting D2D terminal 202 to transmit data may perform a resource scheduling request to the base station 201 (S204).

In this case, the transmitting D2D terminal may transmit first D2D information together with a scheduling request (SR) signal. The first D2D information may include a D2D indicator. Also, the first D2D information may include information on D2D data to be scheduled and D2D feedback configuration information. The scheduling request signal and the first D2D information may be transmitted through an uplink control channel (e.g., a physical uplink control channel (PUCCH)). Alternatively, the D2D indicator of the first D2D information may be transmitted through an uplink control channel, and the remaining information except the D2D indicator among the first D2D information may be transmitted through an uplink data channel corresponding to the uplink control channel including the D2D indicator.

The D2D indicator may include at least one of a D2D link indicator and identification information of the transmitting D2D terminal or the receiving D2D terminal, which indicate that the first D2D information is information related to D2D communication between the transmitting D2D terminal 202 and the receiving D2D terminal 203.

The information on the D2D data may include quality-of-service (QoS) information such as priority and latency sensitivity of the data to be scheduled and information indicating a transmission scheme (e.g., unicast, groupcast, or broadcast). Therefore, in the exemplary embodiment illustrated in FIG. 2, the transmission scheme of the D2D data may be set to unicast.

The D2D feedback configuration information may include at least one of a feedback indicator indicating whether to transmit feedback information for the D2D data and feedback type information indicating a feedback type (e.g., ACK/NACK signal or channel feedback information). For example, when the feedback indicator is composed of 2 bits, '00' may indicate that the feedback for the D2D data is not required, and '11' may indicate that the D2D data is group or broadcast data and the feedback for the group or broadcast data is required, and '01' or '10' may indicate that the D2D data is unicast data and the feedback for the unicast data is required. Priorities may be set in each case or according to a predefined rule. Therefore, in the exemplary embodiment illustrated in FIG. 2, the feedback indicator may be set to '00' or '10'.

The base station 201 may decode the scheduling request for the resource for transmitting the D2D data and the first D2D information which are received from the transmitting D2D terminal 202, allocate the resource for the transmitting the D2D data, and generate sidelink resource allocation grant information (i.e., sidelink grant) to be transmitted to the transmitting D2D terminal 201. The base station 201 may transmit the generated sidelink resource allocation grant information to the transmitting D2D terminal 202 together with the D2D indicator (S205).

The transmitting D2D terminal 202 may receive the sidelink resource allocation grant information from the base station 201 with reference to the D2D indicator (S205). In this case, the resource indicated by resource allocation information included in the sidelink resource allocation grant information may be an uplink resource for sidelink transmission.

The transmitting D2D terminal 202 may transmit D2D control information and data to the receiving D2D terminal 203 using the resource indicated by the received resource allocation information (S206). Here, information on the uplink resource through which the data of the transmitting D2D terminal 202 is transmitted may be included in sidelink control information (SCI) and transmitted to the receiving D2D terminal 203 through a physical sidelink control channel (PSCCH), and the data may be transmitted to the receiving D2D terminal 203 through a physical sidelink shared channel (PSSCH).

Meanwhile, the transmitting D2D terminal 202 may also transmit second D2D information on the data together with the control information and the data. The second D2D information may include all or part of the information included in the first D2D information. That is, the second D2D information may include at least one of the D2D indicator, the feedback indicator, and the feedback type information.

The receiving D2D terminal 203 receiving the control information and the data through the sidelink may decode the received data to generate feedback information including a reception acknowledgment or negative acknowledgment (ACK/NACK) signal (S207).

The receiving D2D terminal 203 may request scheduling of a resource for transmitting the feedback information to the base station 201 in order to transmit the generated feedback information (S208). Here, the priority between another data to be transmitted through uplink or D2D link and the feedback information may be controlled by a QoS control module in the receiving D2D terminal 203. The receiving D2D terminal 203 may transmit a scheduling request for the resource for transmitting the feedback information together with third D2D information.

The third D2D information may include the D2D indicator and may include the D2D feedback configuration information. The scheduling request and the third D2D information transmitted may be transmitted through an uplink control channel. Alternatively, the D2D indicator may be transmitted through an uplink control channel, and the remaining information except the D2D indicator among third D2D information may be transmitted through an uplink data channel corresponding to the uplink control channel including the D2D indicator.

The third D2D information may include all or part of the information included in the first D2D information. That is, the third D2D information may include at least one of the D2D indicator, the feedback indicator, and the feedback type information. However, in the step S208, the transmission of the third D2D information may be omitted. That is, in the step S208, the receiving D2D terminal 203 may transmit only the scheduling request for the resource for transmitting the feedback information to the base station 201.

In response to the scheduling request of the step S208, the base station 201 may transmit a message (e.g., 'feedback transmission assistance information') including information on the resource for transmitting the feedback information to the receiving D2D terminal 203 (S209). That is, the feedback transmission assistance information may be received as being included in a sidelink feedback grant that is a response to the scheduling request of the step S208. Alternatively, the feedback transmission assistance information may be transmitted through a dedicated downlink control channel defined for transmission of the feedback transmission assistance information or a downlink data channel.

The base station 201 may identify that the scheduling for transmitting the feedback information for the D2D data that the D2D terminal 202 transmitted to the D2D terminal 203 is requested by decoding the scheduling request of the step S208, may allocate a downlink resource for transmitting the feedback information, may generate the feedback transmission assistance information, and may transmit the generated feedback transmission assistance information to the receiving D2D terminal 203 (S209).

The receiving D2D terminal 203 may transmit the feedback information to the transmitting D2D terminal 202 using the downlink resource indicated by the feedback transmission assistance information (S210). In this case, the feedback information may be transmitted from the receiving D2D terminal to the transmitting D2D terminal through a downlink control channel (e.g., PDCCH) or through a dedicated downlink control channel defined for transmission of the feedback information.

Figure 3:
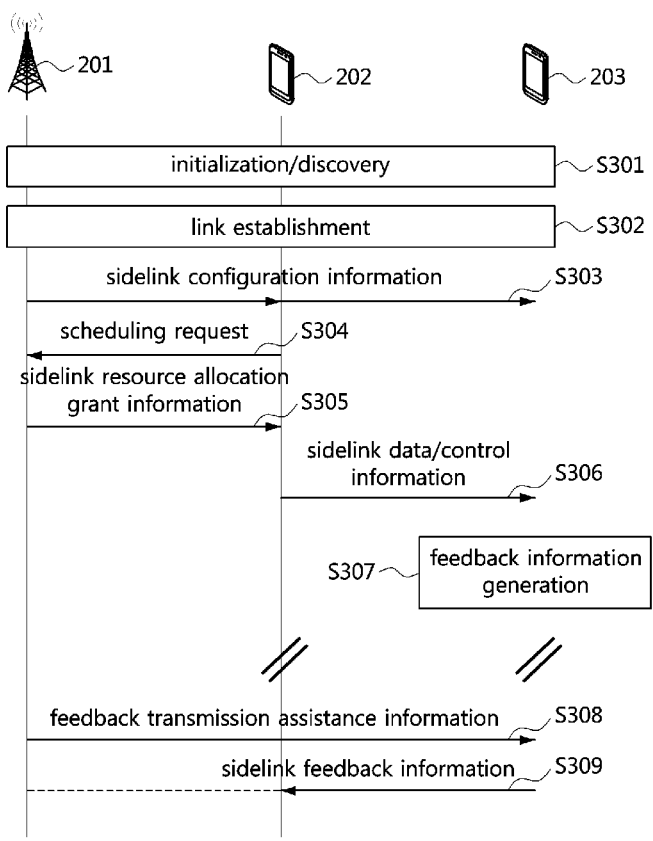
FIG. 3 is a sequence chart for explaining a method of transmitting feedback information for D2D data according to a second exemplary embodiment of the present disclosure.

FIG. 3 is a sequence chart for explaining a method of transmitting feedback information for D2D data according to a second exemplary embodiment of the present disclosure.

The exemplary embodiment illustrated in FIG. 3 may correspond to a case where a receiving D2D terminal receives information on a resource for transmitting feedback information from a base station without a separate process of requesting a base station for the resource for transmitting the feedback information.

Referring to FIG. 3, each of D2D terminals 202 and 203 supporting D2D communication may be located within coverage of a base station 201 and may discover each counterpart terminal (S301). In this case, search for the counterpart terminal may be performed through the base station 201, or may be performed only by signaling between the D2D terminals 202 and 203. Then, the D2D terminals 202 and 203 discovered by each other may establish a D2D link (i.e., sidelink) (S302).

Then, the D2D terminals 202 and 203 may receive D2D configuration information (e.g., sidelink configuration information) from the base station 201 (S303). Here, the D2D configuration information (e.g., sidelink configuration information) is information that is configured in advance with respect to D2D communication required according to a service such as frequency and bandwidth, and is, for example, received as included in an SIB. However, the D2D configuration information may be received in a cell-specific RRC message or UE-specific RRC message, not necessarily SIB. In addition, a part of the D2D configuration information may be received through SIB and the other part may be received through an RRC message.

Then, the transmitting D2D terminal 202 to transmit data may perform a resource scheduling request to the base station 201 (S304).

In this case, the transmitting D2D terminal may transmit first D2D information together with a scheduling request (SR) signal. The first D2D information may include a D2D indicator. Also, the first D2D information may include information on D2D data to be scheduled and D2D feedback configuration information. Further, the first D2D information may include information indicating whether or not a scheduling request for a resource for feedback information for D2D data should be transmitted from the receiving D2D terminal. This information may be used for the base station to determine whether to allocate the resource for transmitting the feedback information after receiving an explicit scheduling request from the receiving D2D terminal, or allocate the resource for transmitting the feedback information without the explicit scheduling request from the receiving D2D terminal. The scheduling request signal and the first D2D information may be transmitted through an uplink control channel (e.g., a PUCCH). Alternatively, the D2D indicator of the first D2D information may be transmitted through an uplink control channel, and the remaining information except the D2D indicator among the first D2D information may be transmitted through an uplink data channel corresponding to the uplink control channel including the D2D indicator.

The D2D indicator may include at least one of a D2D link indicator and identification information of the transmitting D2D terminal or the receiving D2D terminal, which indicate that the first D2D information is information related to D2D communication between the transmitting D2D terminal 202 and the receiving D2D terminal 203.

The information on the D2D data may include QoS information such as priority and latency sensitivity of the data to be scheduled and information indicating a transmission scheme (e.g., unicast, groupcast, or broadcast). Therefore, in the exemplary embodiment illustrated in FIG. 3, the transmission scheme of the D2D data may be set to unicast.

The D2D feedback configuration information may include at least one of a feedback indicator indicating whether to transmit feedback information for the D2D data and feedback type information indicating a feedback type (e.g., ACK/NACK signal or channel feedback information). For example, when the feedback indicator is composed of 2 bits, '00' may indicate that the feedback for the D2D data is not required, and '11' may indicate that the D2D data is group or broadcast data and the feedback for the group or broadcast data is required, and '01' or '10' may indicate that the D2D data is unicast data and the feedback for the unicast data is required. Priorities may be set in each case or according to a predefined rule. Therefore, in the exemplary embodiment illustrated in FIG. 3, the feedback indicator may be set to '00' or '10'.

The base station 201 may decode the scheduling request for the resource for transmitting the D2D data and the first D2D information which are received from the transmitting D2D terminal 202, allocate the resource for the transmitting the D2D data, and generate sidelink resource allocation grant information (i.e., sidelink grant) to be transmitted to the transmitting D2D terminal 201. The base station 201 may transmit the generated sidelink resource allocation grant information to the transmitting D2D terminal 202 together with the D2D indicator (S305).

The transmitting D2D terminal 202 may receive the sidelink resource allocation grant information from the base station 201 with reference to the D2D indicator (S305). In this case, the resource indicated by resource allocation information included in the sidelink resource allocation grant information may be an uplink resource for sidelink.

The transmitting D2D terminal 202 may transmit D2D control information and data to the receiving D2D terminal 203 using the resource indicated by the received resource allocation information (S306). Here, information on the uplink resource through which the data of the transmitting D2D terminal 202 is transmitted may be included in sidelink control information (SCI) and transmitted to the receiving D2D terminal 203 through a physical sidelink control channel (PSCCH), and the data may be transmitted to the receiving D2D terminal 203 through a PSSCH.

Meanwhile, the transmitting D2D terminal 202 may also transmit second D2D information on the data together with the control information and the data. The second D2D information may include all or part of the information included in the first D2D information. That is, the second D2D information may include at least one of the D2D indicator, the feedback indicator, and the feedback type information.

The receiving D2D terminal 203 receiving the control information and the data through the sidelink may decode the received data to generate feedback information including a reception ACK/NACK signal (S307).

Meanwhile, in the step S304, the base station 201 may identify that the D2D data is transmitted in a unicast scheme based on the first D2D information received from the transmitting D2D terminal 202, and identify a transmission scheme of the feedback information for the D2D data based on the information included in the first D2D information. If the corresponding D2D data transmission is a transmission without a scheduling request for the transmission resource of the feedback information, and it is identified that it does not have a latency sensitive characteristic, the base station 201 may generate feedback transmission assistance information by allocating a downlink resource for transmission of the feedback information for the D2D data without a scheduling request of the receiving D2D terminal 203.

Then, the base station 201 may transmit the generated feedback transmission assistance information to the receiving D2D terminal 203 (S308). In this case, a time point at which the base station 201 transmits the feedback transmission assistance information to the receiving D2D terminal 203 may be the same as a time point at which the base station 201 provides the resource allocation information to the receiving D2D terminal 202 in the step S305, or may be a time point after a lapse of a predetermined time (e.g., a time corresponding to the predefined or preconfigured number of symbols, slots, or subframes) from the time point at which the resource allocation information is provided to the transmitting D2D terminal 202.

The feedback transmission assistance information may include the D2D indicator and resource allocation information for transmission of the feedback information. Here, the allocated resource may be a downlink resource for transmission of the feedback information and may be transferred to the receiving D2D terminal 203 indicated by the D2D indicator (S308). Also, the feedback transmission assistance information may be transmitted from the base station to the receiving D2D terminal 203 through a downlink control channel. Alternatively, the feedback transmission assistance information may be transmitted through a dedicated downlink control channel defined for transmission of the feedback transmission assistance information or a downlink data channel.

The receiving D2D terminal 203 receiving the feedback transmission assistance information may transmit the feedback information to the transmitting D2D terminal 202 using the allocated downlink resource (S309). Here, the feedback information may be transmitted from the receiving D2D terminal to the transmitting D2D terminal through a downlink control channel (e.g., PDCCH) or through a dedicated downlink control channel defined for transmission of the feedback information.

Figure 4:
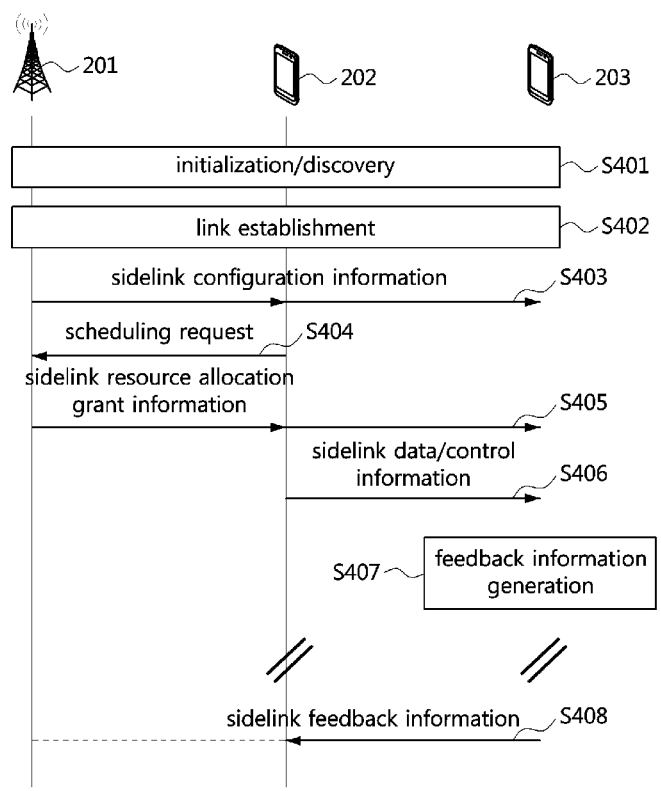
FIG. 4 is a sequence chart for explaining a method of transmitting feedback information for D2D data according to a second exemplary embodiment of the present disclosure.

FIG. 4 is a sequence chart for explaining a method of transmitting feedback information for D2D data according to a second exemplary embodiment of the present disclosure.

The exemplary embodiment illustrated in FIG. 4 may correspond to a case where a receiving D2D terminal receives from a base station information on a resource for transmitting feedback information together with information on a resource for transmitting D2D data without a separate process of requesting the resource for transmission of the feedback information to the base station.

Referring to FIG. 4, each of D2D terminals 202 and 203 supporting D2D communication may be located within coverage of a base station 201 and may discover each counterpart terminal (S401). In this case, search for the counterpart terminal may be performed through the base station 201, or may be performed only by signaling between the D2D terminals 202 and 203. Then, the D2D terminals 202 and 203 discovered by each other may establish a D2D link (i.e., sidelink) (S402).

Then, the D2D terminals 202 and 203 may receive D2D configuration information (e.g., sidelink configuration information) from the base station 201 (S403). Here, the D2D configuration information (e.g., sidelink configuration information) is information that is configured in advance with respect to D2D communication required according to a service such as frequency and bandwidth, and is, for example, received as included in an SIB. However, the D2D configuration information may be received in a cell-specific RRC message or UE-specific RRC message, not necessarily SIB. In addition, a part of the D2D configuration information may be received through SIB and the other part may be received through an RRC message.

Then, the transmitting D2D terminal 202 to transmit data may perform a resource scheduling request to the base station 201 (S404).

In this case, the transmitting D2D terminal may transmit first D2D information together with a scheduling request (SR) signal. The first D2D information may include a D2D indicator. Also, the first D2D information may include information on D2D data to be scheduled and D2D feedback configuration information. Further, the first D2D information may include information indicating whether a scheduling request for a resource for transmitting feedback information for the D2D data should be transmitted from the receiving D2D terminal. This information may be used for the base station to determine whether to allocate the resource for transmitting the feedback information after receiving an explicit scheduling request from the receiving D2D terminal 203, or allocate the resource for transmitting the feedback information without the explicit scheduling request from the receiving D2D terminal 203. The scheduling request signal and the first D2D information may be transmitted through an uplink control channel (e.g., a PUCCH). Alternatively, the D2D indicator of the first D2D information may be transmitted through an uplink control channel, and the remaining information except the D2D indicator among the first D2D information may be transmitted through an uplink data channel corresponding to the uplink control channel including the D2D indicator.

The D2D indicator may include at least one of a D2D link indicator and identification information of the transmitting D2D terminal or the receiving D2D terminal, which indicate that the first D2D information is information related to D2D communication between the transmitting D2D terminal 202 and the receiving D2D terminal 203.

The information on the D2D data may include QoS information such as priority and latency sensitivity of the data to be scheduled and information indicating a transmission scheme (e.g., unicast, groupcast, or broadcast). Therefore, in the exemplary embodiment illustrated in FIG. 4, the transmission scheme of the D2D data may be set to unicast.

The D2D feedback configuration information may include at least one of a feedback indicator indicating whether to transmit feedback information for the D2D data and feedback type information indicating a feedback type (e.g., ACK/NACK signal or channel feedback information). For example, when the feedback indicator is composed of 2 bits, '00' may indicate that the feedback for the D2D data is not required, and '11' may indicate that the D2D data is group or broadcast data and the feedback for the group or broadcast data is required, and '01' or '10' may indicate that the D2D data is unicast data and the feedback for the unicast data is required. Priorities may be set in each case or according to a predefined rule. Therefore, in the exemplary embodiment illustrated in FIG. 4, the feedback indicator may be set to '00' or '10'.

The base station 201 may decode the scheduling request for the resource for transmitting the D2D data and the first D2D information which are received from the transmitting D2D terminal 202, allocate the resource for the transmitting the D2D data, and generate sidelink resource allocation grant information (i.e., sidelink grant) to be transmitted to the transmitting D2D terminal 201. The base station 201 may transmit the generated sidelink resource allocation grant information to the transmitting D2D terminal 202 together with the D2D indicator (S405).

The transmitting D2D terminal 202 may receive the sidelink resource allocation grant information from the base station 201 with reference to the D2D indicator (S405). In this case, the resource indicated by resource allocation information included in the sidelink resource allocation grant information may be an uplink resource for sidelink.

Meanwhile, the base station 201 may identify that the D2D data is transmitted in a unicast scheme based on the first D2D information received from the transmitting D2D terminal 202, and identify a transmission scheme of the feedback information for the D2D data based on the information included in the first D2D information. If the corresponding D2D data transmission is a transmission without a scheduling request for the transmission resource of the feedback information, and it is identified that it has a latency sensitive characteristic, the base station 201 may generate feedback transmission assistance information by allocating a downlink resource for transmission of the feedback information for the D2D data for which the scheduling is requested. Then, in the step S405, the base station may transmit the generated feedback transmission assistance information together with the resource allocation information for the sidelink data.

The resource allocation grant information may include second D2D information including the D2D indicator and the resource allocation information for the sidelink data. In this case, the allocated resource may be an uplink resource for the sidelink data and may be transmitted to the transmitting D2D terminal 202 (explicitly or implicitly) indicated by the D2D indicator included in the first D2D information.

Also, the feedback transmission assistance information may include third D2D information including the D2D indicator and resource allocation information for transmission of the feedback information. In this case, the allocated resource may be a downlink resource for transmitting the feedback information and may be transmitted to the receiving D2D terminal 203 (explicitly or implicitly) indicated by the D2D indicator included in the first D2D information. Unlike in the case of groupcast transmission, which will be described later with reference to FIG. 5, in the present exemplary embodiment, the resource allocation information for transmission of the feedback information included in the feedback transmission assistance information may be a downlink resource allocated exclusively to the receiving D2D terminal 203. Also, the feedback transmission assistance information may be transmitted from the base station to the receiving D2D terminal through a downlink control channel. Alternatively, the feedback transmission assistance information may be transmitted through a dedicated downlink control channel defined for transmission of the feedback transmission assistance information or a downlink data channel.

The transmitting D2D terminal 202 may receive the second D2D information including the D2D indicator and the resource allocation information from the base station, and transmit D2D control information and data using the allocated uplink resource for sidelink (S406). In this case, the information on the uplink resource through which the data of the transmitting D2D terminal 202 is transmitted may be included in an SCI and transmitted to the Receiving D2D terminal 203 through a PSCCH, and the data may be transmitted to the Receiving D2D terminal 203 through a PSSCH.

Meanwhile, the transmitting D2D terminal may also transmit fourth D2D information on the data together with the control information and the data. The fourth D2D information may include all or part of the information included in the first D2D information. That is, the fourth D2D information may include at least one of the D2D indicator, the feedback indicator, and the feedback type information. However, in the step S406, the transmission of the fourth D2D information may be omitted. That is, in the step S406, the transmitting D2D terminal 202 may transmit only the control information and data to the receiving D2D terminal 203.

The receiving D2D terminal 203 receiving the control information and the data through the sidelink may decode the received data to generate feedback information including a reception ACK/NACK signal (S407).

The receiving D2D terminal 203 may transmit the feedback information to the transmitting D2D terminal 202 using the downlink resource allocated by the feedback transmission assistance information that has been received in advance (S408). Here, the feedback information may be transmitted from the receiving D2D terminal to the transmitting D2D terminal through a downlink control channel (e.g., PDCCH) or through a dedicated downlink control channel defined for transmission of the feedback information.

Figure 5:
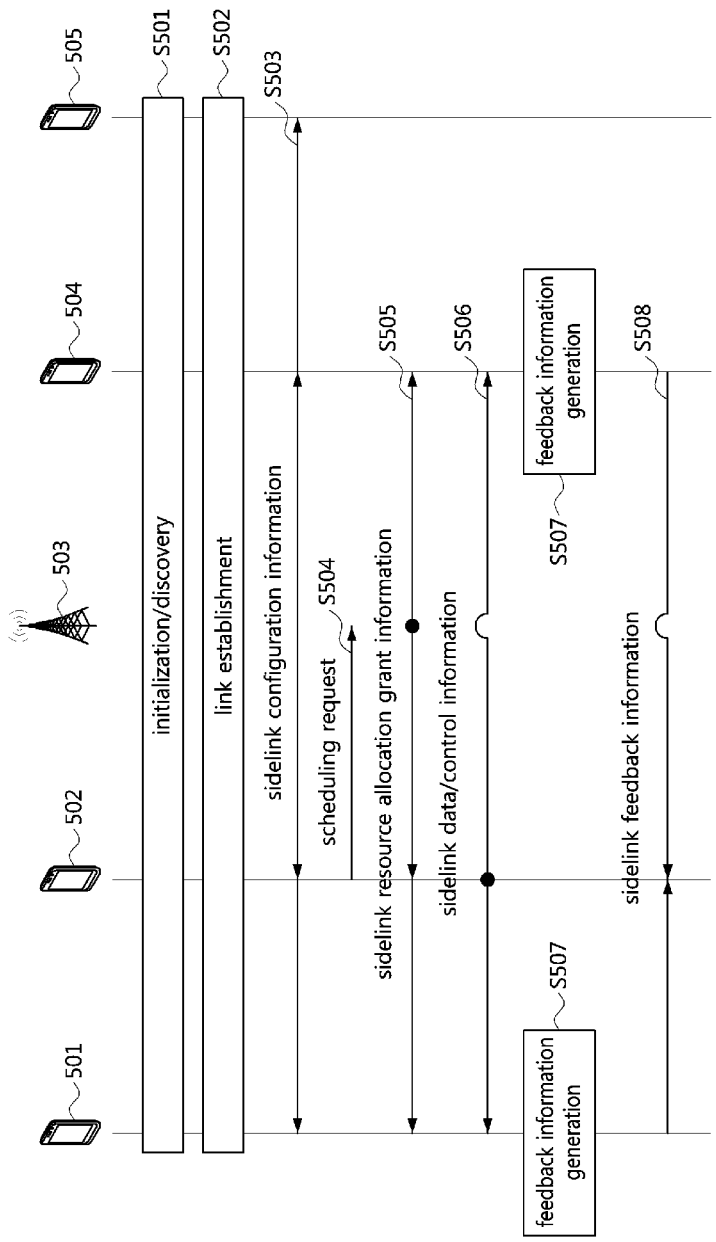
FIG. 5 is a sequence chart for explaining a method of transmitting feedback information for D2D data according to a fifth exemplary embodiment of the present disclosure.

FIG. 5 is a sequence chart for explaining a method of transmitting feedback information for D2D data according to a fifth exemplary embodiment of the present disclosure.

The exemplary embodiment illustrated in FIG. 5 may correspond to a case where a transmitting D2D terminal performs groupcast transmission, and a plurality of receiving D2D terminals receive from a base station information on a resource for transmission of feedback information together with information on a resource for transmission of D2D data without a separate process of requesting the resource for transmission of the feedback information to the base station.

Referring to FIG. 5, each of D2D terminals 501, 502, 504, and 505 supporting D2D communication may be located within coverage of a base station 503 and may discover each counterpart terminal (S501). In this case, search for the counterpart terminal may be performed through the base station 503, or may be performed only by signaling between the D2D terminals 501, 502, 504, and 505. Then, the D2D terminals 501, 502, 504, and 505 discovered by each other may establish D2D link(s) (i.e., sidelink(s)) (S502). In this case, if many-to-many link configuration is not supported, each of the terminals 501, 502, 504, and 505 may establish one-to-one link. Alternatively, without link establishment, a group for groupcast transmission may be formed with the D2D terminals 501, 502, 504, and 505 (i.e., group formation).

Then, the D2D terminals 501, 502, 504, and 505 may receive D2D configuration information (e.g., sidelink configuration information) from the base station 503 (S503). Here, the D2D configuration information (e.g., sidelink configuration information) is information that is configured in advance with respect to D2D communication required according to a service such as frequency and bandwidth, and is, for example, received as included in an SIB. However, the D2D configuration information may be received in a cell-specific RRC message or UE-specific RRC message, not necessarily SIB. In addition, a part of the D2D configuration information may be received through SIB and the other part may be received through an RRC message.

Then, the transmitting D2D terminal 502 to transmit data may perform a resource scheduling request to the base station 503 (S504).

In this case, the transmitting D2D terminal 502 may transmit first D2D information together with a scheduling request (SR) signal. The first D2D information may include a D2D indicator. Also, the first D2D information may include information on D2D data to be scheduled and D2D feedback configuration information. Further, the first D2D information may include information indicating whether a scheduling request for a resource for transmitting feedback information for the D2D data should be transmitted from a receiving D2D terminal. This information may be used for the base station to determine whether to allocate the resource for transmitting the feedback information after receiving an explicit scheduling request from a receiving D2D terminal, or allocate the resource for transmitting the feedback information without the explicit scheduling request from a receiving D2D terminal. The scheduling request signal and the first D2D information may be transmitted through an uplink control channel (e.g., a PUCCH). Alternatively, the D2D indicator of the first D2D information may be transmitted through an uplink control channel, and the remaining information except the D2D indicator among the first D2D information may be transmitted through an uplink data channel corresponding to the uplink control channel including the D2D indicator.

The D2D indicator may include at least one of a D2D link indicator and identification information of the transmitting D2D terminal or the receiving D2D terminal, which indicate that the first D2D information is information related to D2D communication between the transmitting D2D terminal 502 and receiving D2D terminals 501 and 504. Therefore, in the present exemplary embodiment, the D2D indicator may be set to a group identifier indicating the terminals 501, 502, and 504 that are the targets of the groupcast transmission. That is, in the embodiment of FIG. 5, the group targeted for the groupcast transmission of the transmitting D2D terminal 502 may include the terminals 501, 502, and 504, and the terminal 505 may be excluded.

The information on the D2D data may include QoS information such as priority and latency sensitivity of the data to be scheduled and information indicating a transmission scheme (e.g., unicast, groupcast, or broadcast). Therefore, in the exemplary embodiment illustrated in FIG. 5, the transmission scheme of the D2D data may be set to groupcast.

The D2D feedback configuration information may include at least one of a feedback indicator indicating whether to transmit feedback information for the D2D data and feedback type information indicating a feedback type (e.g., ACK/NACK signal or channel feedback information). For example, when the feedback indicator is composed of 2 bits, '00' may indicate that the feedback for the D2D data is not required, and '11' may indicate that the D2D data is group or broadcast data and the feedback for the group or broadcast data is required, and '01' or '10' may indicate that the D2D data is unicast data and the feedback for the unicast data is required. Priorities may be set in each case or according to a predefined rule. Therefore, in the exemplary embodiment illustrated in FIG. 5, the feedback indicator may be set to '11'.

The base station 503 may decode the first D2D information and the scheduling request for the resource for transmitting the D2D data which are received from the transmitting D2D terminal 502, allocate the resource for the transmitting the D2D data, and generate sidelink resource allocation grant information (i.e., sidelink grant) to be transmitted to the transmitting D2D terminal 502. The base station 503 may transmit the generated sidelink resource allocation grant information to the transmitting D2D terminal 502 together with the D2D indicator (S505).

The transmitting D2D terminal 502 may receive the sidelink resource allocation grant information from the base station 201 with reference to the D2D indicator (S505). In this case, the resource indicated by resource allocation information included in the sidelink resource allocation grant information may be an uplink resource for sidelink.

Meanwhile, the base station 503 may identify that the D2D data is transmitted in a groupcast scheme based on the first D2D information received from the transmitting D2D terminal 502, and identify a transmission scheme of the feedback information for the D2D data based on the information included in the first D2D information. If the corresponding D2D data transmission is a transmission without a scheduling request for the transmission resource of the feedback information, and it is identified that it has a latency sensitive characteristic, the base station 503 may allocate a downlink resource pool for one or more feedback transmission for the groupcast D2D data for which scheduling is requested, and generate feedback transmission assistance information including information on a starting resource number, an offset value, and the number of resources for the resource pool. The base station 503 may transmit the generated feedback transmission assistance information together with the resource allocation information for the D2D data (S505).

The resource allocation grant information may include second D2D information including the D2D indicator and the resource allocation information for the sidelink data. In this case, the allocated resource may be an uplink resource for the sidelink data and may be transmitted to the transmitting D2D terminal 502 indicated by the D2D indicator included in the first D2D information.

Also, the feedback transmission assistance information may include third D2D information including the D2D indicator and resource allocation information for transmission of the feedback information. In this case, the allocated resource may be a downlink resource for transmitting the feedback information and may be transmitted to all the receiving D2D terminals indicated by the D2D indicator included in the first D2D information. For example, the D2D indicator included in the first D2D information may be an identifier for the group indicating the plurality of receiving terminals that are subject to the groupcast transmission as a group identifier. Also, the feedback transmission assistance information may be transmitted from the base station to the receiving D2D terminals 501 and 503 through a downlink control channel. Alternatively, the feedback transmission assistance information may be transmitted through a dedicated downlink control channel defined for transmission of the feedback transmission assistance information or a downlink data channel. For example, in FIG. 5, since the terminal 505 is not included in the group indicated by the D2D indicator, the sidelink resource allocation grant information including the feedback transmission assistance information is not transmitted to the terminal 505.

The downlink resource pool allocated by the feedback transmission assistance information may include downlink resources for transmission of one or more feedback information. The feedback transmission assistance information may be transmitted from the base station to the receiving D2D terminals through a downlink control channel. Alternatively, the feedback transmission assistance information may be transmitted through a dedicated downlink control channel defined for transmission of the feedback transmission assistance information or a downlink data channel.

The transmitting D2D terminal 502 may receive the second D2D information including the D2D indicator and the resource allocation information from the base station, and transmit D2D control information and data using the allocated uplink resource for sidelink (S506). In this case, the information on the uplink resource through which the data of the transmitting D2D terminal 502 is transmitted may be included in an SCI and transmitted to the Receiving D2D terminals 501 and 504 through a PSCCH, and the data may be transmitted to the Receiving D2D terminals 501 and 504 through a PSSCH.

Meanwhile, the transmitting D2D terminal 502 may also transmit fourth D2D information on the data together with the control information and the data. The fourth D2D information may include all or part of the information included in the first D2D information. That is, the fourth D2D information may include at least one of the D2D indicator, the feedback indicator, and the feedback type information. However, in the step S506, the transmission of the fourth D2D information may be omitted. That is, in the step S506, the transmitting D2D terminal 502 may transmit only the control information and data to the receiving D2D terminals 501 and 504.

Each of the receiving D2D terminals 501 and 504 receiving the control information and the data through the sidelink may decode the received data to generate feedback information including a reception ACK/NACK signal (S507).

Then, each of the receiving D2D terminals 501 and 504 may select a resource allocated to itself from the downlink resource pool indicated by the feedback transmission assistance information, and transmit the feedback information to the transmitting D2D terminal 502 using the selected resource (S508). In this case, the feedback information may be transmitted from each of the receiving D2D terminals 501 and 504 to the transmitting D2D terminal 502 through a downlink control channel (e.g., PDCCH) or a dedicated downlink control channel defined only for sidelink feedback transmission.

On the other hand, the information on the downlink resource pool for the feedback information included in the feedback transmission assistance information may not be transmitted to all the D2D terminals in the step S503 of FIG. 5, but may be transmitted only to the groupcast target D2D terminals through the step S505. This is to limit the D2D terminals receiving the information on the resource pool to reduce collisions between selected resources that may occur in the resource pool. Also, the resource pool may be temporarily used as a resource pool allocated by the base station that has recognized the occurrence of the groupcast D2D data.

As a method for the receiving D2D terminals to autonomously select the resource for transmitting the feedback information in the downlink resource pool for the feedback information, various distributed scheduling methods may be applied to prevent a collision.

As an example, the number of receiving D2D terminals belonging to the groupcast target group may be signaled to the receiving D2D terminals as included in the feedback transmission assistance information. Then, each receiving D2D terminal may use a resource having a relation of an integer multiple of a result value obtained by performing a modular operation on unique numbers of the resources constituting the resource pool and its identification number so as to utilize the resource pool without collision. However, the number of resources constituting the resource pool may be equal to or larger than the number of D2D terminals belonging to the groupcast target group.

More detailed description is as follows. First, it may be assumed that the resource pool is composed of R resources, and the r-th resource is designated with a unique number r ($r=1, 2, 3, \ldots, R$). Also, it may be assumed that the number of receiving D2D terminals of the groupcast is N, and the n-th receiving D2D terminal receives its identification number n ($n=1, 2, 3, \ldots, N$) in the groupcast through the feedback transmission assistance information.

In this case, when $i = r \% N$ ($0 \leq i \leq N-1$), the n-th receiving D2D terminal generating feedback information in response to the received data (S507) may use a resource r having a location where (i+1) is identical to n to transmit the feedback information.

For example, in a groupcast consisting of 4 receiving D2D terminals and a resource pool composed of 20 resources in total, the second D2D terminal has an identification number of 2, and may use one or more resources (e.g., $2^{nd}$, $6^{th}$, $10^{th}$, $14^{th}$, and $18^{th}$) spaced apart from each other by N intervals as shown in Table 2 below to transmit its feedback information. Through such the distributed resource scheduling, resource collision of feedback transmission with 3 other terminals can be avoided.

TABLE 2

| i + 1 | 1 | 2 | 3 | 4 |
|---|---|---|---|---|
| i | 0 | 1 | 2 | 3 |
| R | 1 | 2 | 3 | 4 |
|   | 5 | 6 | 7 | 8 |
|   | 9 | 10 | 11 | 12 |
|   | 13 | 14 | 15 | 16 |
|   | 17 | 18 | 19 | 20 |

According to a method in which the receiving D2D terminal autonomously selects a resource for transmitting the feedback information in the resource pool, the information requested by each receiving D2D terminal may be transmitted from the base station through the feedback transmission assistance information. That is, the number of resources constituting the resource pool and the number of receiving D2D terminals constituting the groupcast target group may be dynamically changed, and accordingly, the content of the feedback transmission assistance information transmitted for each groupcast transmission may be also changed.

Figure 6:
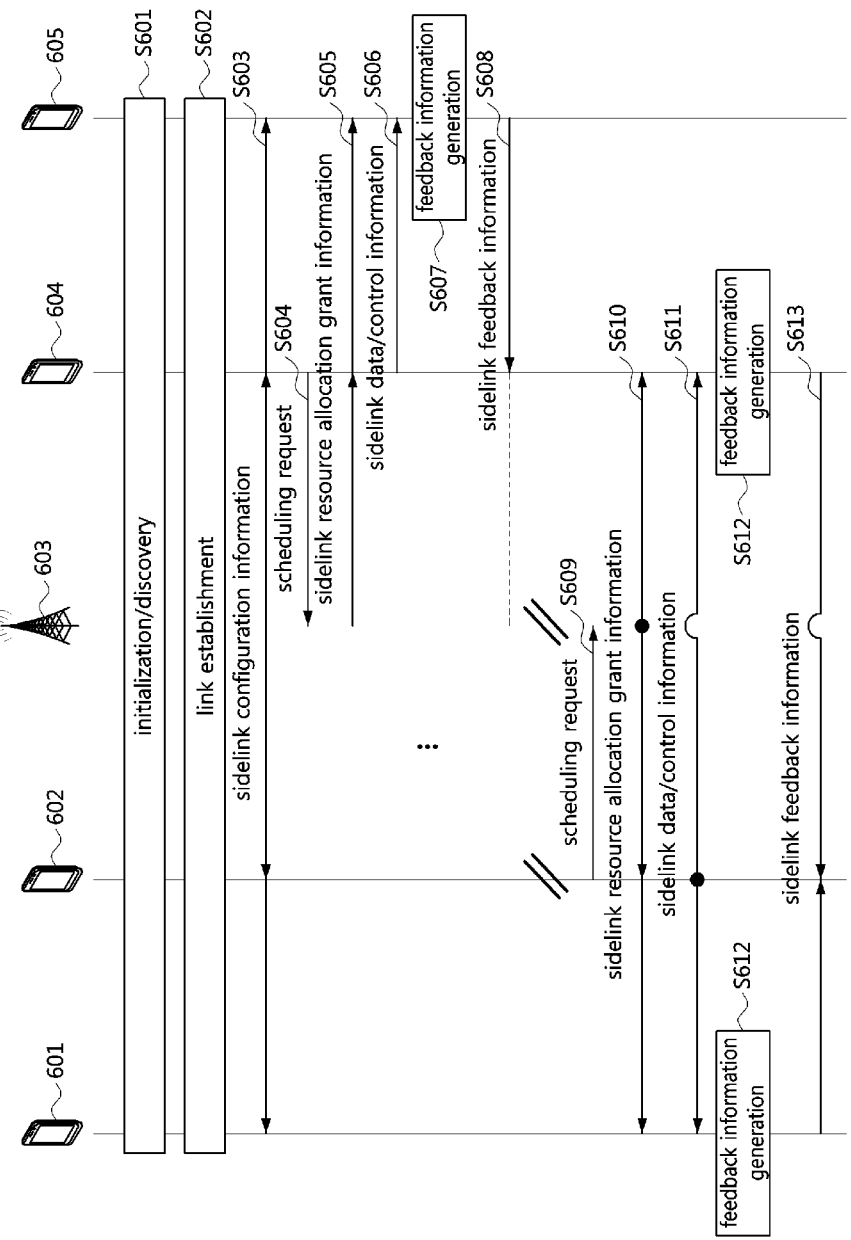
FIG. 6 is a sequence chart illustrating a situation in which methods for transmitting feedback information for D2D data according to the third and fourth exemplary embodiments of the present disclosure are performed.

FIG. 6 is a sequence chart illustrating a situation in which methods for transmitting feedback information for D2D data according to the third and fourth exemplary embodiments of the present disclosure are performed.

Referring to FIG. 6, steps S601 to S603 may be performed identically to or similarly to the steps S501 to S503 described with reference to FIG. 5.

First, D2D terminals 604 and 605 may perform unicast transmission and reception in which the D2D terminal 604 becomes a transmitting D2D terminal. That is, steps S604 to S608 may correspond to the steps S404 to S408 of the exemplary embodiment described through FIG. 4 as a case of unicast transmission.

Then, the D2D terminals 601, 602, and 604 may perform groupcast transmission and reception in which the D2D terminal 602 becomes a transmitting D2D terminal. That is, steps S609 to S613 may correspond to the steps S504 to S508 of the exemplary embodiment described with reference to FIG. 5 as a case of groupcast transmission.

Figure 7:
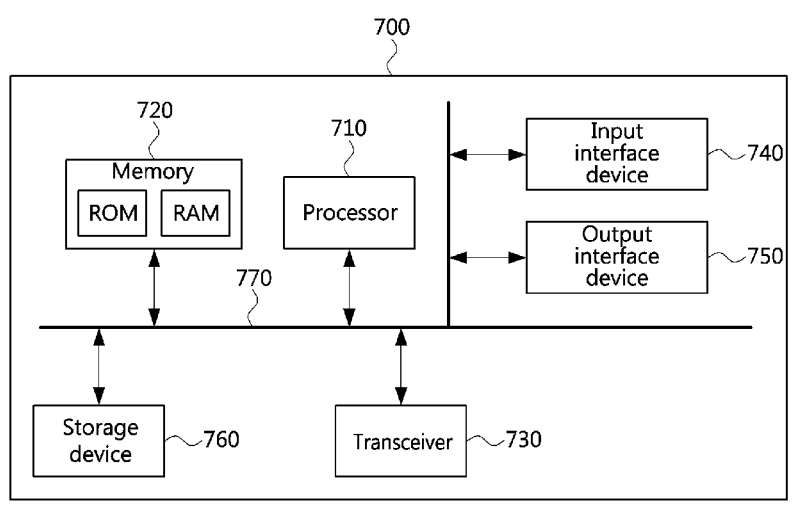
FIG. 7 is a block diagram illustrating a configuration of a D2D terminal according to exemplary embodiments of the present disclosure.

FIG. 7 is a block diagram illustrating a configuration of a D2D terminal according to exemplary embodiments of the present disclosure.

Referring to FIG. 7, each of D2D terminals (transmitting D2D terminal or receiving D2D terminal) to which the feedback information transmission method according to the exemplary embodiments of the present disclosure are applied may include a processor 710, a memory 720, a transceiver 730 capable of transmitting and receiving data and control information with a base station or a counterpart terminal, a storage device 760, and a bus 770. The processor 710, the memory 720, the transceiver 730, and the storage device 740 may be connected through the bus 770 to communicate with each other. Also, the processor 710, the memory 720, the transceiver 730, and the storage device 740 may be directly connected through a dedicated one-to-one interface.

The processor 710 may execute at least one program instruction stored in at least one of the memory 720 and the storage device 740. The processor 710 may refer to a central processing unit (CPU), a graphics processing unit (GPU), or a dedicated processor on which methods according to exemplary embodiments of the present disclosure are performed. Each of the memory 720 and the storage device 740 may be configured of at least one of a volatile storage medium and a nonvolatile storage medium. For example, the memory 720 may be configured as at least one of read only memory (ROM) and random access memory (RAM). The at least one program instruction executed by the processor 710 may cause the process 710 to control the transceiver 730 to perform at least some of the steps described with reference to FIGS. 2 to 5.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A device-to-device (D2D) communication method performed by a receiving D2D terminal, the D2D communication method comprising:
   receiving D2D data from a transmitting D2D terminal;
   generating feedback information for the D2D data; and
   receiving information on a first resource for transmission of the feedback information from a base station, and transmitting the feedback information to the transmitting D2D terminal through the first resource,
   wherein the information on the first resource is received without a separate process of transmitting an additional scheduling request (SR) to the base station, and the information on the first resource is received at a time point identical to a first time point when a grant for a scheduling request (SR) of the transmitting D2D terminal is transmitted from the base station or a time point after a lapse of a predefined or preconfigured time from the first time point; and
   wherein when the transmitting D2D terminal performs an SR to the base station, information indicating whether the receiving D2D terminal performs feedback on the D2D data is transmitted to the base station, and the information on the first resource is received when the receiving D2D terminal is indicated to perform the feedback on the D2D data.

2. The D2D communication method according to claim 1, wherein the D2D data is received from the transmitting D2D terminal through an uplink resource for the base station, and the feedback information is transmitted to the transmitting D2D terminal through the first resource which is a downlink resource for the base station.

3. The D2D communication method according to claim 2, wherein transmission of the feedback information through the first resource is performed together with an uplink transmission to the base station or another D2D link transmission or reception operation of the receiving D2D terminal.

4. The D2D communication method according to claim 1, wherein the information on the first resource is received from the base station through a physical downlink control channel (PDCCH).

5. The D2D communication method according to claim 1, wherein the feedback information is transmitted to the transmitting D2D terminal through a physical downlink control channel (PDCCH) or a dedicated physical downlink channel for sidelink feedback information.

6. A device-to-device (D2D) communication method performed by a receiving D2D terminal, the D2D communication method comprising:

receiving, from a base station, information on a first resource for reception of D2D data and information on a second resource for transmission of feedback information for the D2D data;

receiving the D2D data from a transmitting D2D terminal through the first resource;

generating the feedback information for the D2D data; and transmitting the feedback information to the transmitting D2D terminal through the second resource, wherein the first resource is requested by the transmitting D2D terminal, and when the first resource is requested by the transmitting D2D terminal, the transmitting D2D terminal transmits to the base station at least one of information on the D2D data, whether or not to receive the feedback information for the D2D data, and a type of the feedback information.

7. The D2D communication method according to claim 6, wherein the D2D data is received from the transmitting D2D terminal through the first resource which is an uplink resource for the base station, and the feedback information is transmitted to the transmitting D2D terminal through the second resource which is a downlink resource for the base station.

8. The D2D communication method according to claim 6, wherein the information on the second resource is received from the base station through a physical downlink control channel (PDCCH).

9. The D2D communication method according to claim 6, wherein when the D2D data is unicast data, the second resource is a resource allocated exclusively to the receiving D2D terminal.

10. The D2D communication method according to claim 6, wherein when the D2D data is groupcast data, the second resource is a resource pool allocated to a plurality of receiving D2D terminals including the receiving D2D terminal.

11. The D2D communication method according to claim 6, wherein the feedback information is transmitted to the transmitting D2D terminal through a physical downlink control channel (PDCCH) or a dedicated physical downlink channel for sidelink feedback information.

12. A device-to-device (D2D) communication method performed by a transmitting D2D terminal, the D2D communication method comprising:

requesting, from a base station, a first resource for transmission of D2D data for at least one receiving D2D terminal;

receiving, from the base station, information on the first resource and information on a second resource for reception of feedback information for the D2D data from the at least one receiving D2D terminal;

transmitting the D2D data to the at least one receiving D2D terminal through the first resource; and receiving the feedback information for the D2D data from the at least one receiving D2D terminal through the second resource, wherein in the requesting of the first resource, the transmitting D2D terminal transmits to the base station at least one of information on the D2D data, whether or not to receive the feedback information for the D2D data, and a type of the feedback information.

13. The D2D communication method according to claim 12, wherein the D2D data is transmitted by the transmitting D2D terminal through the first resource which is an uplink resource for the base station, and the feedback information is received from the at least one receiving D2D terminal through the second resource which is a downlink resource for the base station.

14. The D2D communication method according to claim 12, wherein the information on the second resource is received from the base station through a physical downlink control channel (PDCCH).

15. The D2D communication method according to claim 12, wherein when the D2D data is unicast data, the at least one receiving D2D terminal is one receiving D2D terminal, and in the requesting of the first resource, the transmitting D2D terminal transmits to the base station an identifier of the one receiving D2D terminal or an identifier of a D2D link between the one receiving D2D terminal and the transmitting D2D terminal.

16. The D2D communication method according to claim 12, wherein when the D2D data is groupcast data, the at least one receiving D2D terminal is a plurality of receiving D2D terminals, and in the requesting of the first resource, the transmitting D2D terminal transmits to the base station a group identifier indicating the plurality of receiving D2D terminals.

17. The D2D communication method according to claim 12, wherein the second resource is a resource pool from which the at least one receiving D2D terminal selects a resource for transmitting the feedback information for the D2D data.

\* \* \* \* \*